United States Patent
Giuliano et al.

(10) Patent No.: US 12,516,893 B2
(45) Date of Patent: Jan. 6, 2026

(54) HEAT EXCHANGERS WITH FLOW-MODIFYING HEAT EXCHANGER CORE TUBES

(71) Applicant: Hamilton Sundstrand Corporation, Charlotte, NC (US)

(72) Inventors: John Giuliano, North Granby, CT (US); Viktor Kilchyk, Lancaster, NY (US); Paul M. Colson, Westfield, MA (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 194 days.

(21) Appl. No.: 18/109,520

(22) Filed: Feb. 14, 2023

(65) Prior Publication Data
US 2024/0271889 A1    Aug. 15, 2024

(51) Int. Cl.
| | |
|---|---|
| *F28F 9/22* | (2006.01) |
| *B33Y 80/00* | (2015.01) |
| *F02C 7/14* | (2006.01) |
| *F28D 1/053* | (2006.01) |
| *F28D 21/00* | (2006.01) |

(Continued)

(52) U.S. Cl.
CPC ............... *F28F 9/22* (2013.01); *B33Y 80/00* (2014.12); *F02C 7/14* (2013.01); *F28D 1/05383* (2013.01); *F28F 1/02* (2013.01); *F28F 7/02* (2013.01); *F05D 2260/213* (2013.01);

(Continued)

(58) Field of Classification Search
CPC ..... B33Y 80/00; F02C 7/14; F05D 2260/213; F28D 1/05383; F28D 2021/0026; F28F 9/22; F28F 1/02; F28F 7/02; F28F 2009/226; F28F 2210/02; F28F 2250/02
See application file for complete search history.

(56) References Cited

U.S. PATENT DOCUMENTS

| | | | |
|---|---|---|---|
| 7,810,552 B2 | 10/2010 | Slaughter | |
| 10,539,377 B2 * | 1/2020 | Turney | ...................... F28F 9/02 |

(Continued)

FOREIGN PATENT DOCUMENTS

| | | | | |
|---|---|---|---|---|
| CH | 337861 A * | 4/1959 | ................ | F28F 1/08 |
| EP | 3800417 A1 * | 4/2021 | ........... | F28D 7/0016 |

(Continued)

OTHER PUBLICATIONS

J.Y. Ho, K.K. Wong, K.C. Leong, T.N. Wong, "Convective heat transfer performance of airfoil heat sinks fabricated by selective laser melting," International Journal of Thermal Sciences, vol. 114, 2017, pp. 213-228, ISSN 1290-0729, https://doi.org/10.1016/j.ijthermalsci.2016.12.016.

(Continued)

*Primary Examiner* — Ljiljana V. Ciric
(74) *Attorney, Agent, or Firm* — Kinney & Lange, P.A.

(57) ABSTRACT

A heat exchanger includes a first header including a fluid inlet, a second header positioned downstream of the first header with respect to a first internal fluid flow path of a first fluid and including a fluid outlet, and a core extending from the first header to the second header. The core includes a plurality of flow-modifying core tubes that are shaped, angled, and/or arranged to modify flow through the heat exchanger along a second external fluid flow path. The plurality of flow-modifying core tubes includes airfoil tubes with corresponding airfoil cross-sections.

16 Claims, 9 Drawing Sheets

(51) Int. Cl.
*F28F 1/02* (2006.01)
*F28F 7/02* (2006.01)
(52) U.S. Cl.
CPC ............. *F28D 2021/0026* (2013.01); *F28F 2009/226* (2013.01); *F28F 2210/02* (2013.01); *F28F 2250/02* (2013.01)

(56) References Cited

U.S. PATENT DOCUMENTS

| | | | |
|---|---|---|---|
| 10,995,996 B2 * | 5/2021 | Erno | F28F 21/084 |
| 11,118,838 B2 * | 9/2021 | Joseph | F28D 1/0475 |
| 11,168,942 B2 * | 11/2021 | Becene | F28D 1/047 |
| 11,209,222 B1 * | 12/2021 | Colson | F28F 9/24 |
| 11,226,158 B2 * | 1/2022 | Streeter | F28F 7/02 |
| 11,268,770 B2 * | 3/2022 | Ruiz | F28F 9/0263 |
| 11,274,886 B2 * | 3/2022 | Becene | F28D 7/024 |
| 11,280,550 B2 * | 3/2022 | Becene | F28D 1/05333 |
| 11,280,554 B2 * | 3/2022 | Horoszczak | F28F 7/02 |
| 11,359,864 B2 * | 6/2022 | Becene | F28D 7/02 |
| 11,396,069 B2 * | 7/2022 | Norman | B23P 15/26 |
| 11,415,377 B2 * | 8/2022 | Sawicki | F28D 7/0025 |
| 11,519,670 B2 | 12/2022 | Fausett et al. | |
| 11,660,577 B2 * | 5/2023 | Patel | F23D 14/22 366/336 |
| 11,666,994 B2 * | 6/2023 | Norman | B23P 15/26 165/173 |
| 11,761,709 B2 * | 9/2023 | Horoszczak | F28F 1/04 165/156 |
| 11,802,734 B2 * | 10/2023 | Vaidyanathan | F28D 7/1653 |
| 12,038,236 B2 * | 7/2024 | Horoszczak | F28D 9/0062 |
| 12,051,854 B2 * | 7/2024 | Franzini | H01Q 21/064 |
| 12,130,090 B2 * | 10/2024 | Ruiz | F28F 9/0263 |
| 12,209,823 B2 * | 1/2025 | Kirsch | B33Y 10/00 |
| 12,215,938 B2 * | 2/2025 | Giuliano | F28F 7/02 |
| 2004/0094291 A1 * | 5/2004 | Memory | F28D 1/0478 165/150 |
| 2005/0081379 A1 | 4/2005 | Askani et al. | |
| 2009/0145581 A1 | 6/2009 | Hoffman et al. | |
| 2010/0263847 A1 * | 10/2010 | Alahyari | F28D 1/05333 165/173 |
| 2018/0195813 A1 * | 7/2018 | Turney | F28F 9/0243 |
| 2019/0024987 A1 * | 1/2019 | Moore | F28F 3/02 |
| 2020/0041212 A1 * | 2/2020 | Palmer | F28F 1/025 |
| 2020/0284519 A1 * | 9/2020 | Becene | F02C 7/14 |
| 2021/0102756 A1 * | 4/2021 | Becene | F28F 7/02 |
| 2021/0254896 A1 * | 8/2021 | Borghese | F28F 21/084 |
| 2022/0260316 A1 * | 8/2022 | Becker | F28F 7/02 |
| 2023/0068512 A1 * | 3/2023 | Giuliano | F28F 1/006 |
| 2024/0210125 A1 * | 6/2024 | Giuliano | F28F 9/02 |
| 2024/0253141 A1 * | 8/2024 | Holroyd | F04D 29/42 |
| 2024/0271889 A1 * | 8/2024 | Giuliano | F28F 1/02 |
| 2025/0129990 A1 * | 4/2025 | Kilchyk | F28F 7/02 |

FOREIGN PATENT DOCUMENTS

| | | | | |
|---|---|---|---|---|
| EP | 3855106 A1 * | 7/2021 | | B33Y 80/00 |
| EP | 3957943 A1 * | 2/2022 | | B33Y 80/00 |
| EP | 4141370 A1 * | 3/2023 | | F28F 9/00 |
| EP | 4230943 A1 * | 8/2023 | | B33Y 80/00 |
| EP | 4389423 A1 * | 6/2024 | | F28F 9/02 |
| EP | 4417923 A2 * | 8/2024 | | B33Y 80/00 |
| FR | 2264262 A1 | 10/1975 | | |
| JP | S5221447 U | 2/1977 | | |
| JP | 2010256004 A | 11/2010 | | |
| WO | WO-2016057443 A1 * | 4/2016 | | F28D 7/0008 |
| WO | 2022152716 A1 | 7/2022 | | |

OTHER PUBLICATIONS

Partial European Search Report for European Patent Application No. 24157684.2, Dated Jun. 25, 2024, 12 Pages.
Extended European Search Report for European Patent Application No. 24157684.2, Dated Sep. 16, 2024, 11 Pages.

* cited by examiner

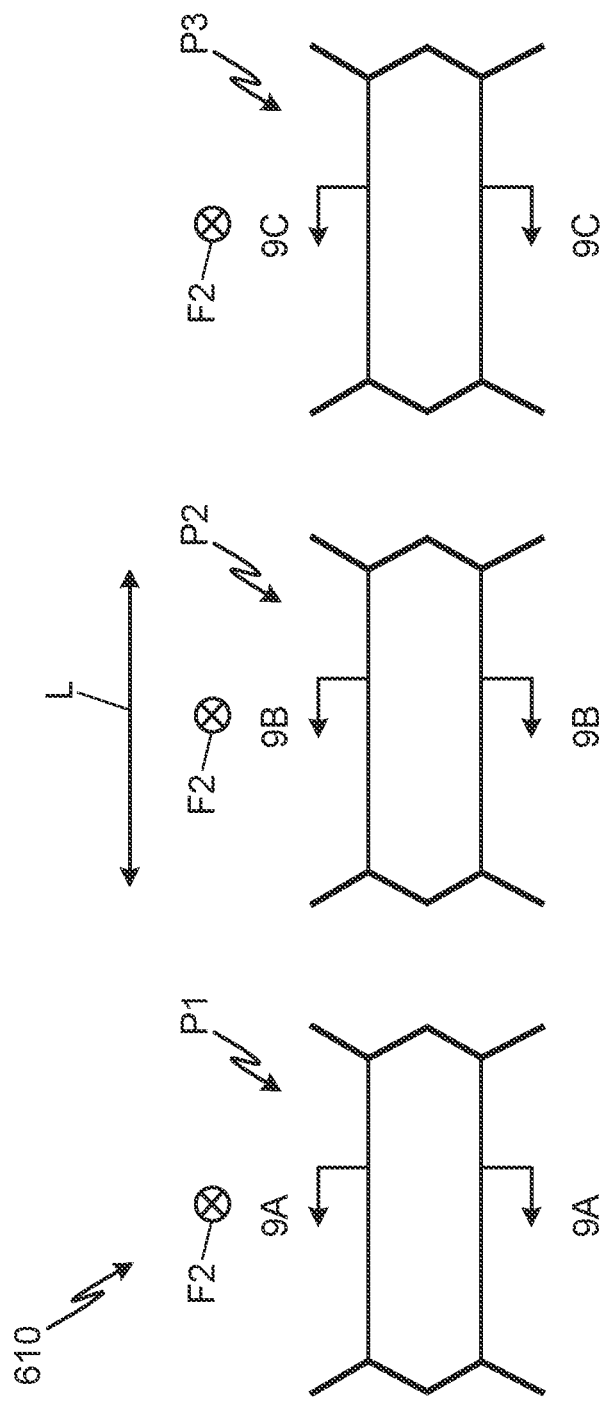
Fig. 9
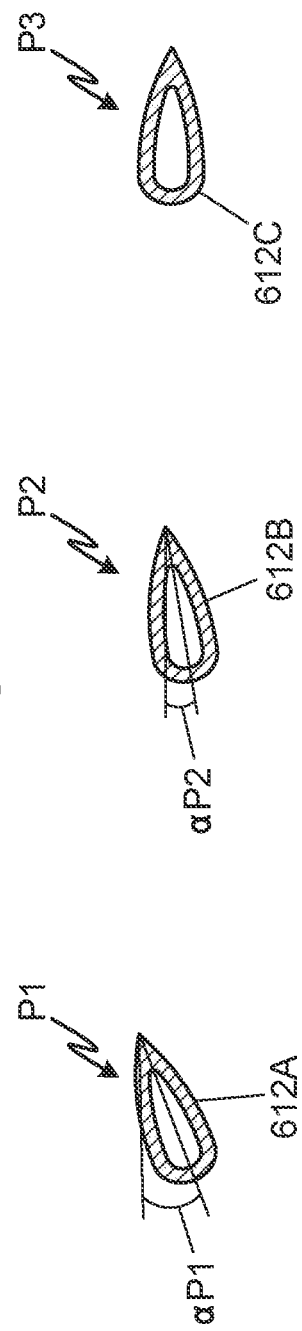
Fig. 9A
Fig. 9B
Fig. 9C

HEAT EXCHANGERS WITH FLOW-MODIFYING HEAT EXCHANGER CORE TUBES

BACKGROUND

The present disclosure relates generally to heat exchangers, and more specifically to heat exchanger core tubes.

Heat exchangers are used in many industries for a variety of applications. In mobile applications, particularly for aerospace applications, heat exchangers may be used to provide compact, low-weight, and highly effective means of exchanging heat from a hot fluid to a cold fluid. Additive manufacturing techniques can be utilized to manufacture heat exchangers layer by layer to obtain a variety of complex heat exchanger geometries.

SUMMARY

In one example, a heat exchanger includes a first header including a fluid inlet, a second header positioned downstream of the first header with respect to a first internal fluid flow path of a first fluid and including a fluid outlet, and a core extending from the first header to the second header. The core includes a plurality of flow-modifying core tubes that are shaped, angled, and/or arranged to modify flow through the heat exchanger along a second external fluid flow path. The plurality of flow-modifying core tubes includes airfoil tubes with corresponding airfoil cross-sections.

In another example, an open-volume heat exchanger includes a first header including a fluid inlet, a second header positioned downstream of the first header with respect to a first internal fluid flow path of a first fluid and including a fluid outlet, and a core extending from the first header to the second header. The core includes a tube bank with open sides that extends from a first end to a second end with respect to a second external fluid flow path. The tube bank includes a plurality of airfoil tubes. One or more airfoil tubes of the plurality of airfoil tubes that are located proximal to the open sides of the tube bank are angled and/or shaped to modify flow through the heat exchanger along the second external fluid flow path such that portions of the flow are prevented from escaping through open sides of the tube bank.

In another example, a heat exchanger includes a first header including a fluid inlet, a second header positioned downstream of the first header with respect to a first internal fluid flow path of a first fluid and including a fluid outlet, and a core extending from the first header to the second header. The core includes a plurality of flow-modifying core tubes. The plurality of flow-modifying core tubes includes at least one of airfoil tubes with corresponding angles of attack that vary throughout the airfoil tubes or along ones of the airfoil tubes or a combination of airfoil tubes and round tubes.

BRIEF DESCRIPTION OF THE DRAWINGS

FIG. 9 is a schematic diagram illustrating portions of a sixth example of a flow-modifying core tube.

FIG. 9A is a schematic cross-sectional view of a first portion of the sixth example of the flow-modifying core tube taken at section line 9A-9A of FIG. 9.

FIG. 9B is a schematic cross-sectional view of a second portion of the sixth example of the flow-modifying core tube taken at section line 9B-9B of FIG. 9.

FIG. 9C is a schematic cross-sectional view of a third portion of the sixth example of the flow-modifying core tube taken at section line 9C-9C of FIG. 9.

DETAILED DESCRIPTION

Figure 2:
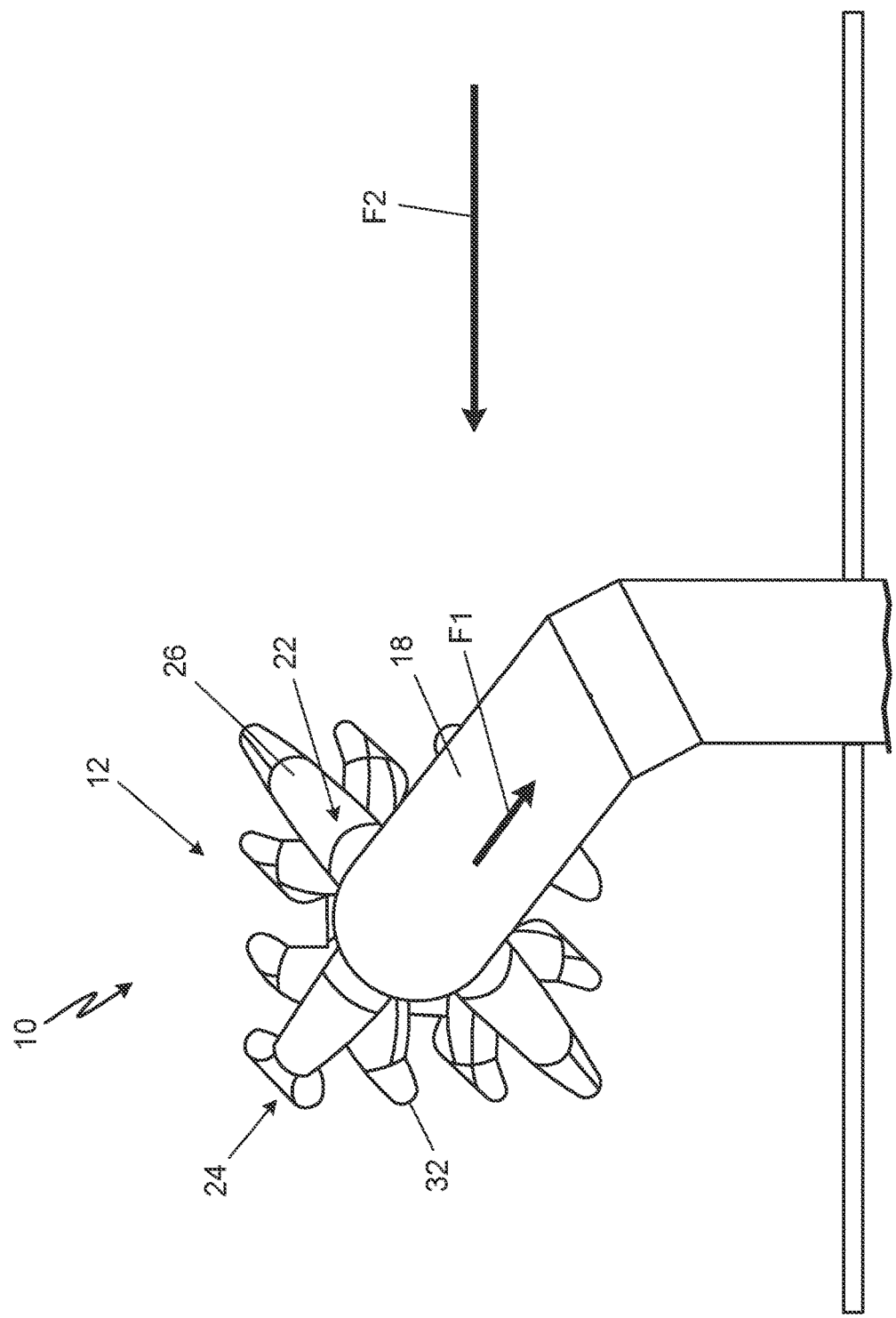
FIG. 2 is a schematic diagram illustrating a side view of the heat exchanger and fluid flow in the heat exchange system of FIG. 1.
Figure 3:
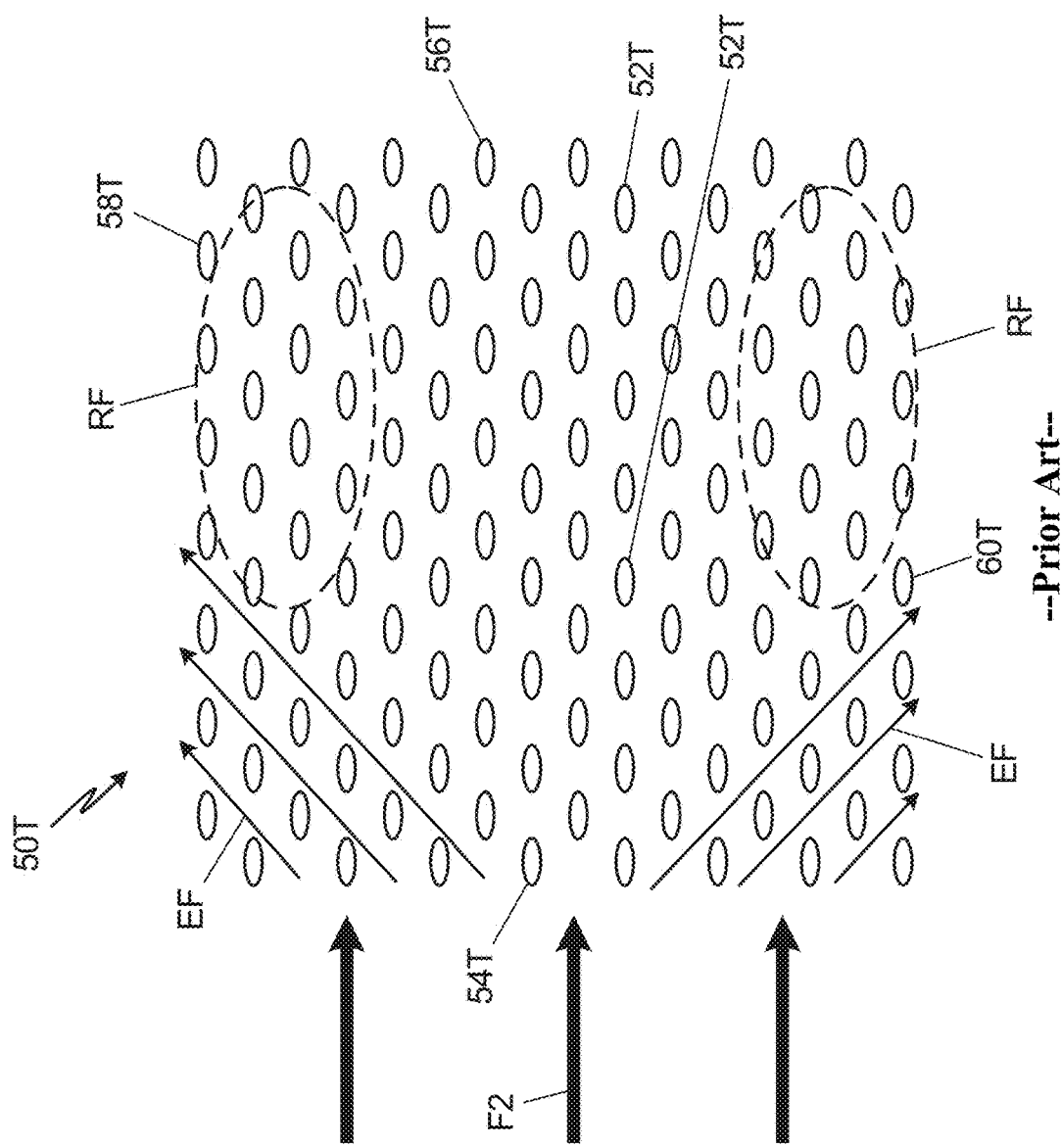
FIG. 3 is a schematic cross-sectional diagram illustrating areas of reduced flow in a traditional open-volume heat exchanger tube bank.

As described herein, heat exchangers are often located in an open-volume or duct where an external fluid flow can pass either through or around the heat exchanger. Maximizing the flow through the heat exchanger while minimizing the flow bypassing the heat exchanger can improve the performance of the heat exchanger. An additively manufactured heat exchanger can include flow-modifying core tubes that are shaped, angled, and arranged to direct flow through the heat exchanger and thereby improve heat transfer. Flow-modifying core tubes according to techniques of this disclosure and heat exchangers including the flow-modifying core tubes are described below with reference to FIGS. 1-2 and 4-9C. FIG. 3 illustrates an example of traditional, non-flow-modifying core tubes.

Figure 1:
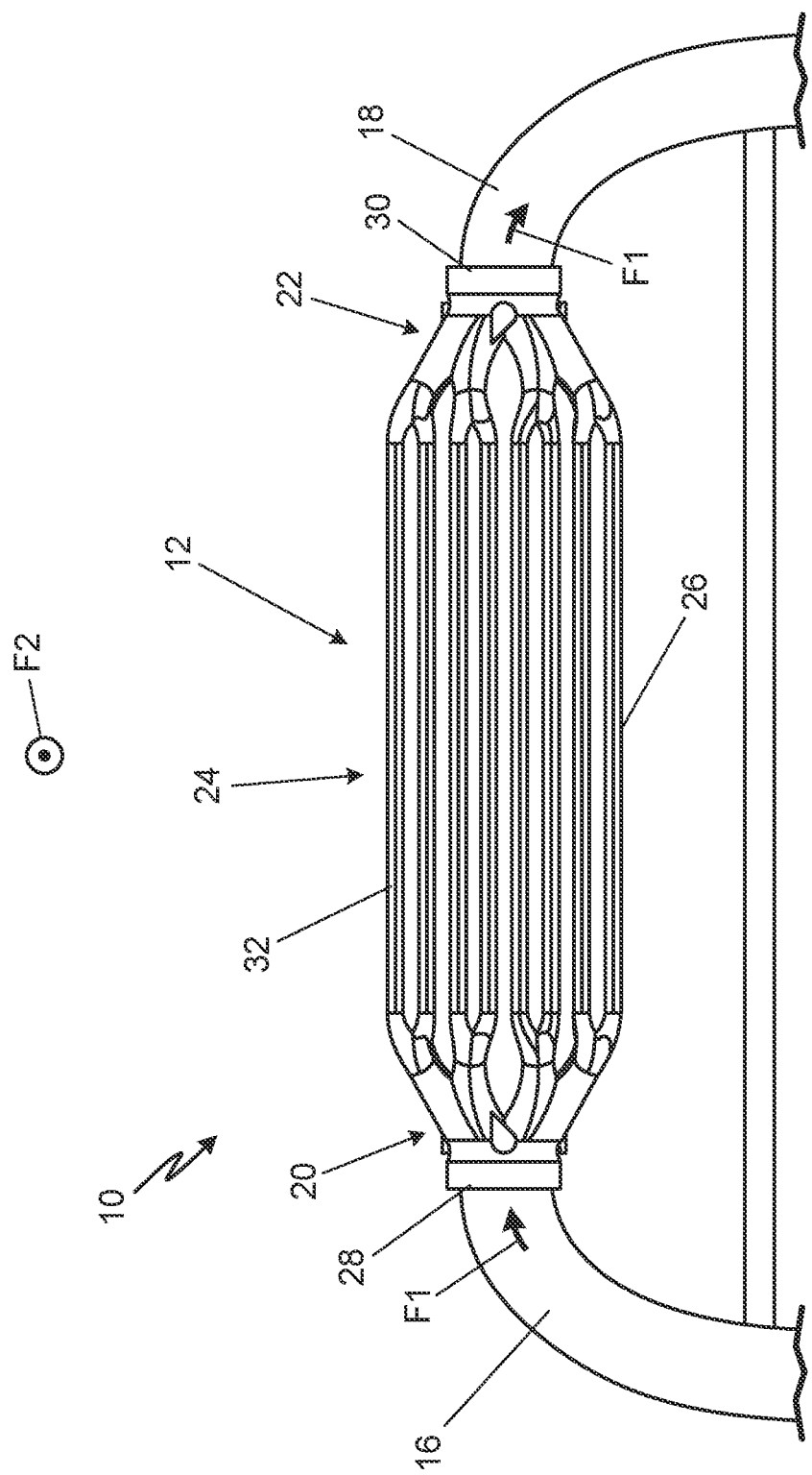
FIG. 1 is a schematic diagram illustrating a rear view of a heat exchanger in a heat exchange system.

FIG. 1 is a schematic diagram illustrating a rear view of heat exchanger 12 in heat exchange system 10. FIG. 2 is a schematic diagram illustrating a side view of heat exchanger 12 and fluid flow in heat exchange system 10. FIGS. 1-2 will be described together. FIGS. 1-2 show heat exchange system 10, including heat exchanger 12, first duct 16 (shown in FIG. 1), and second duct 18. Heat exchanger 12 includes first header 20 (shown in FIG. 1), second header 22, core 24, and exterior surface 26. As shown in FIG. 1, first header 20 includes fluid inlet 28, and second header 22 includes fluid outlet 30. Core 24 includes flow-modifying core tubes 32. FIGS. 1-2 also show internal fluid flow path F1 and external fluid flow path F2.

Heat exchange system 10 includes heat exchanger 12 connected between first duct 16 and second duct 18. In some examples, heat exchange system 10 can be on an aircraft, such as part of an aircraft environmental control system or other aircraft system. In other examples, heat exchange system 10 can be used in any implementation for exchanging heat between fluids. Heat exchanger 12 in heat exchange system 10 is situated in an open-volume or duct where external fluid flow (e.g., fluid flow along external fluid flow path F2) can pass either through or around heat exchanger 12.

First duct 16 and second duct 18 are pipes, tubes, or other passageways for containing fluid flowing (i.e., "flow") into or out of heat exchanger 12. First duct 16 connects to a first end of heat exchanger 12, and second duct 18 connects to a second end of heat exchanger 12. As illustrated in FIG. 1, heat exchanger 12 forms a relatively straight path between first duct 16 and second duct 18 such that first duct 16 and second duct 18 are on opposite ends of heat exchanger 12. In other examples, heat exchanger 12 could form a curved path between ducts in any orientation with respect to one another.

Heat exchanger 12 is connected to first duct 16 at first header 20. More specifically, first duct 16 is connected to fluid inlet 28 of first header 20. Fluid inlet 28 includes a first opening into the flow passages of heat exchanger 12. Heat exchanger 12 is similarly connected to second duct 18 at fluid outlet 30 of second header 22. Fluid outlet 30 includes a second opening into the flow passages of heat exchanger 12. As illustrated in FIG. 1, each of first header 20 and second header 22 can be a branched or fractal header. That is, first header 20 and/or second header 22 can include a consecutively branching tubular structure that terminates in individual tubes that are continuous with corresponding individual flow-modifying core tubes 32 of core 24. In the example shown in FIG. 1, first header 20 and second header 22 have mirrored branching structures having the same number and arrangement of sequential branches; however, it should be understood that other examples can include first header 20 and second header 22 with different respective branching structures. In yet other examples, first header 20 can be any suitable type of header for directing fluid from first duct 16 into core 24 of heat exchanger 12, and second header 22 can be any suitable type of header for directing fluid from core 24 into second duct 18.

Core 24 of heat exchanger 12 extends from first header 20 to second header 22. Core 24 can form an overall straight path between first header 20 and second header 22 (e.g., as shown in FIG. 1) or can be curved or split into different portions, depending on the space (i.e., envelope) in which heat exchanger 12 will be mounted. Core 24 includes flow-modifying core tubes 32. Accordingly, core 24 can also be considered a tube bank comprised of a plurality of flow-modifying core tubes 32. Each of flow-modifying core tubes 32 is an individual tube through which fluid can flow along internal fluid flow path F1. Moreover, each of flow-modifying core tubes 32 is connected to a corresponding individual tube of first header 20 at one end and to a corresponding individual tube of second header 22 at an opposite end. Flow-modifying core tubes 32 are spaced apart from adjacent tubes. Although not shown in FIG. 1, core 24 can also include supports between ones of flow-modifying core tubes 32. As will be described in greater detail below, flow-modifying core tubes 32 can take several different forms, including different shapes, angles, and arrangements, for modifying fluid flow through heat exchanger 12 along external fluid flow path F2.

Heat exchange system 10 includes two flow paths: internal fluid flow path F1 and external fluid flow path F2. In general, internal fluid flow path F1 is formed by a series of continuous passages through first duct 16, heat exchanger 12, and second duct 18. External fluid flow path F2 surrounds and passes around components of heat exchanger 12. As illustrated in FIGS. 1-2, heat exchange system 10 is configured such that a first fluid flows along internal fluid flow path F1 and a second fluid flows along external fluid flow path F2 in a crossflow arrangement. That is, internal fluid flow path F1 is generally perpendicular to external fluid flow path F2. Alternatively, heat exchange system 10 could be configured such that internal fluid flow path F1 and external fluid flow path F2 are counter-parallel and the first and second fluids would interact in a counterflow arrangement.

Heat exchanger 12 is configured to permit the transfer of heat between the first fluid flowing along internal fluid flow path F1 and the second fluid flowing along external fluid flow path F2. The first and second fluids can be any type of fluids, including air, water, lubricant, fuel, or another fluid. Moreover, the first and second fluids can be the same or different types of fluids. The first fluid and the second fluid can have different temperatures. Heat exchanger 12 is generally described herein as providing heat transfer from the first fluid to the second fluid; therefore, the first fluid can be at a greater temperature than the second fluid at the point where the first fluid enters heat exchanger 12. However, other heat exchange configurations of heat exchange system 10 can include the second fluid at a greater temperature than the first fluid. Additionally, in the example shown in FIGS. 1-2, heat exchanger 12 is shown receiving the first fluid along internal fluid flow path F1 at fluid inlet 28 of first header 20. That is, first header 20 can be a relatively upstream header with respect to second header 22 along internal fluid flow path F1, and second header 22 can be a relatively downstream header. In other examples, the direction of flow of the first fluid can be reversed along internal fluid flow path F1 such that the first fluid exits rather than enters heat exchanger 12 at fluid inlet 28.

In operation, the first fluid flows along an initial segment of internal fluid flow path F1 through first duct 16 and enters heat exchanger 12 at fluid inlet 28 of first header 20. The first fluid flows along an intermediate segment of internal fluid flow path F1 through the branching tubular structure of first header 20 into flow-modifying core tubes 32 of core 24 and—from there—into the branching tubular structure of second header 22. The first fluid flows downstream into second header 22 from flow-modifying core tubes 32 and is discharged from second header 22 at fluid outlet 30. The first fluid flows along a final segment of internal fluid flow path F1 within second duct 18. Alternatively, the flow direction of the first fluid along internal fluid flow path F1 can be reversed. Exterior surface 26 of heat exchanger 12 is exposed to the second fluid as it flows along external fluid flow path F2, as shown in FIG. 2. Heat transfer between the first fluid and the second fluid can occur at first header 20, second header 22, and/or core 24 as the first fluid flows through heat exchanger 12 along internal fluid flow path F1 and the second fluid contacts exterior surface 26 as it flows along external fluid flow path F2.

Heat exchanger 12 and its component parts (e.g., first header 20, second header 22, and core 24) can be integrally formed partially or entirely by additive manufacturing. For metal components (e.g., nickel-based superalloys, aluminum, titanium, etc.) exemplary additive manufacturing processes include powder bed fusion techniques such as direct metal laser sintering (DMLS), laser net shape manufacturing (LNSM), electron beam manufacturing (EBM), to name a few, non-limiting examples. For polymer or plastic components, stereolithography (SLA) can be used. Additive manufacturing is useful for obtaining unique geometries and for reducing the need for welds or other attachments (e.g., between a header and core). However, it should be understood that other suitable manufacturing and/or post-manufacture machining techniques can also be used.

During an additive manufacturing process, heat exchanger 12 can be formed layer by layer to achieve varied dimensions (e.g., cross-sectional area, wall thicknesses, curvature, etc.) and complex internal passages and/or components, such as flow-modifying core tubes 32, for example. Each additively manufactured layer creates a new horizontal build plane to which a subsequent layer of heat exchanger 12 is fused. That is, the build plane for the additive manufacturing process remains horizontal but shifts vertically by defined increments (e.g., one micrometer, one hundredth of a millimeter, one tenth of a millimeter, a millimeter, or other distances) as manufacturing proceeds. Therefore, heat exchanger 12, including flow-modifying core tubes 32, can be additively manufactured as a single, monolithic unit or part. The integral formation of heat exchanger 12 with flow-modifying core tubes 32 by additive manufacturing allows for the consolidation of parts and can reduce or eliminate the need for any post-process machining that is typically required with traditionally manufactured components. FIGS. 1-2 show heat exchanger 12 fully manufactured.

FIG. 3 is a schematic cross-sectional diagram illustrating areas of reduced flow RF in traditional open-volume heat exchanger tube bank 50T. FIG. 3 shows tube bank 50T including core tubes 52T. Tube bank 50T also includes first end 54T, second end 56T, first side 58T, and second side 60T. FIG. 3 also shows external fluid flow path F2, escaping flow EF, and areas of reduced flow RF.

Tube bank 50T, as shown in cross-section in FIG. 3, makes up all or a portion of a core of a traditional open-volume heat exchanger. Tube bank 50T includes core tubes 52T. Core tubes 52T are traditional elliptical tubes, rather than flow-modifying core tubes 32 (shown in FIGS. 1-2). As shown in FIG. 3, tube bank 50T includes first end 54T, second end 56T, first side 58T, and second side 60T. Tube bank 50T extends laterally (i.e., in the direction of external fluid flow path F2) from first end 54T to second end 56T. That is, first end 54T is a relatively upstream end of tube bank 50T, and second end 56T is a relatively downstream end of tube bank 50T, with respect to fluid flowing along external fluid flow path F2. Tube bank 50T also extends vertically (i.e., perpendicular to both the direction of external fluid flow path F2 and the direction of internal fluid flow path F1 through core tubes 52T, not shown) from first side 58T to second side 60T.

When tube bank 50T of a traditional open-volume heat exchanger is positioned in external fluid flow path F2 through an open environment, the heat exchanger will cause an increased pressure drop for fluid passing through the heat exchanger and tube bank 50T compared to fluid passing around the heat exchanger. This increased pressure drop will cause a portion of the flow to divert around the heat exchanger and to escape through first side 58T and second side 60T of tube bank 50T, as illustrated by the arrows showing escaping flow EF in FIG. 3. Because a portion of the flow is diverted or escapes from tube bank 50T, areas of reduced flow RF result. As shown in FIG. 3, tube bank 50T may include at least two areas of reduced flow RF, as indicated by the dashed line ovals. Areas of reduced flow RF can result in regions of tube bank 50T downstream from first end 54T and nearer to first side 58T or second side 60T (i.e., away from a central path through tube bank 50T). Areas of reduced flow RF can cause the traditional open-volume heat exchanger that includes tube bank 50T (i.e., without flow-modifying core tubes 32) to be less effective.

Several examples of flow-modifying core tubes according to techniques of this disclosure will be described with reference to FIGS. 4-9C. Each of the flow-modifying core tube examples shown in FIGS. 4-9C is an example of flow-modifying core tubes 32, as shown in FIGS. 1-2. Each of the flow-modifying core tube examples shown in FIGS. 4-9C also includes several generally similar components, which share the same name and which are identified by shared reference numbers that are increased incrementally between groups of FIG. 4-9 (e.g., FIG. 4 includes flow-modifying core tubes 110, FIG. 5 includes flow-modifying core tubes 210, FIG. 6 includes flow-modifying core tubes 310, FIG. 7 includes flow-modifying core tubes 410, FIG. 8 includes flow-modifying core tubes 510, and FIGS. 9-9C include flow-modifying core tube 610). For case of discussion, details of some components of the flow-modifying core tube examples shown in FIGS. 4-9C may not be repeated in each of the following sections, but it should be understood that the flow-modifying core tube examples shown in FIGS. 4-9C can include all or any combination of the components and features described herein. Moreover, although depicted in FIGS. 4-9C as separate examples, a heat exchanger including flow-modifying core tubes according to techniques of this disclosure can generally include any combination of the following features. That is, variations of flow-modifying core tubes are possible in groups of tubes, tube to tube, and within a single tube.

Figure 4:
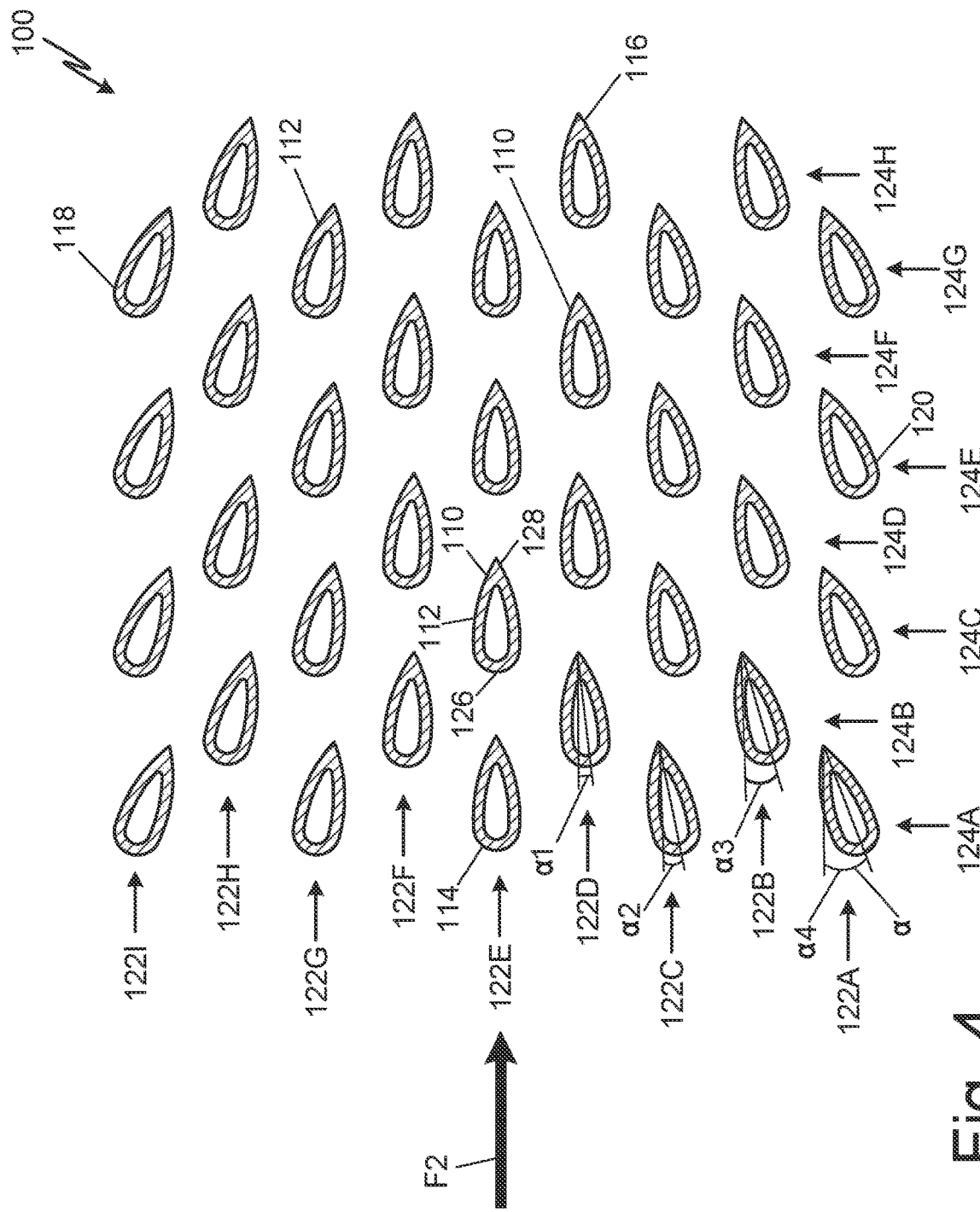
FIG. 4 is a schematic cross-sectional diagram illustrating a first example of flow-modifying core tubes.

FIG. 4 is a schematic cross-sectional diagram illustrating flow-modifying core tubes 110. FIG. 4 shows tube bank 100 including flow-modifying core tubes 110, which include airfoil tubes 112. Tube bank 100 also includes first end 114, second end 116, first side 118, and second side 120. Flow-modifying core tubes 110 are arranged in rows 122A-122I and columns 124A-124H. Each of airfoil tubes 112 has leading edge 126, trailing edge 128, and a corresponding angle of attack $\alpha_1$-$\alpha_4$ (referred to collectively herein as "angle of attack $\alpha$"). FIG. 4 also shows external fluid flow path F2.

Tube bank 100, as shown in cross-section in FIG. 4, makes up all or a portion of a core of an open-volume heat exchanger (e.g., core 24 of heat exchanger 12 as shown in FIGS. 1-2). As shown in FIG. 4, tube bank 100 includes first end 114, second end 116, first side 118, and second side 120. Tube bank 100 extends laterally (i.e., in the direction of external fluid flow path F2) from first end 114 to second end 116. That is, first end 114 is a relatively upstream end of tube bank 100, and second end 116 is a relatively downstream end of tube bank 100, with respect to fluid flowing along external fluid flow path F2. Tube bank 100 also extends vertically (i.e., perpendicular to both the direction of external fluid flow path F2 and the direction of internal fluid flow path F1 through flow-modifying core tubes 110, not shown) from first side 118 to second side 120. First end 114, second end 116, first side 118, and second side 120 are open to external flow (i.e., are open ends/sides).

Tube bank 100 includes flow-modifying core tubes 110. Flow-modifying core tubes 110 are an example of flow-modifying core tubes 32, as shown in FIGS. 1-2. Tube bank 100 can include any suitable number of individual flow-modifying core tubes 110. Flow-modifying core tubes 110 are arranged in rows 122A-122I that each extend from first end 114 to second end 116. In the example shown in FIG. 4, there are nine rows 122A-122I of flow-modifying core tubes 110, and rows 122A-122I include four flow-modifying core tubes 110 per row. In other examples, there can be more or fewer rows of flow-modifying core tubes 110 in tube bank 100, and each row can include any number of flow-modifying core tubes 110. Flow-modifying core tubes 110 are also arranged in columns 124A-124H that each extend from first side 118 to second side 120. In the example shown in FIG. 4, there are eight columns 124A-124H of flow-modifying core tubes 110, and columns 124A-124H include alternating totals of four and five flow-modifying core tubes 110 per column. In other examples, there can be more or fewer columns of flow-modifying core tubes 110 in tube bank 100, and each column can include any number of flow-modifying core tubes 110. Flow-modifying core tubes 110 in columns adjacent or proximal to first end 114 (e.g., columns 124A and 124B) can be referred to as "leading tubes" with respect to the direction of fluid flowing along external fluid flow path F2 as it enters tube bank 100.

Flow-modifying core tubes 110 include airfoil tubes 112. In the example shown in FIG. 4, each of flow-modifying core tubes 110 is also one of airfoil tubes 112. In other examples, flow-modifying core tubes 110 can include airfoil tubes 112 and one or more differently shaped tubes, such as round shapes (e.g., as will be described in greater detail below with reference to FIGS. 6-7), regular or irregular polygonal shapes, etc. Airfoil tubes 112 have airfoil cross-sections. More specifically, airfoil tubes 112 have symmetric airfoil cross-sections. Each of airfoil tubes 112 extends from a corresponding leading edge 126 to a corresponding trailing edge 128. Leading edges 126 are relatively upstream portions of airfoil tubes 112, and trailing edges 128 are relatively downstream portions of airfoil tubes 112, with respect to fluid flowing along external fluid flow path F2.

Each of airfoil tubes 112 has a corresponding angle of attack $\alpha$. For example, angle of attack $\alpha$ can vary from row to row. In other examples, angle of attack $\alpha$ can vary in other ways throughout tube bank 100, such as from tube to tube. In yet other examples, angle of attack $\alpha$ does not vary throughout tube bank 100. In the example shown in FIG. 4, ones of airfoil tubes 112 have different angles of attack $\alpha 1$-$\alpha 4$. Specifically, airfoil tubes 112 in row 122A have angle of attack $\alpha 4$, airfoil tubes 112 in row 122B have angle of attack $\alpha 3$, airfoil tubes 112 in row 122C have angle of attack $\alpha 2$, airfoil tubes 112 in row 122D have angle of attack $\alpha 1$, and airfoil tubes 112 in row 122E have a zero-degree (0°) angle of attack (not shown). Each of angles of attack $\alpha 1$-$\alpha 4$ can be a different angle. As shown in FIG. 4, angles of attack $\alpha 1$-$\alpha 4$ can increase outwardly from a central portion of tube bank 100 (e.g., row 122E, also referred to herein as "center row 122E") toward first side 118 (e.g., row 122I) or second side 120 (e.g., row 122A). The increase can be incremental in rows outward from center row 122E. In one example, angle of attack $\alpha 1$ can be five degrees (5°), angle of attack $\alpha 2$ can be ten degrees (10°), angle of attack $\alpha 3$ can be fifteen degrees (15°), and angle of attack $\alpha 4$ can be twenty degrees (20°). In other examples, angles of attack $\alpha 1$-$\alpha 4$ can be any suitable angles (including up to a maximum angle above which causes flow separation), and there can be more or fewer different angles of attack $\alpha$ throughout tube bank 100 in any pattern. For example, the pattern of different angles of attack $\alpha$ may not be reflected across center row 122E because, due to buoyancy, a heated fluid flowing along external fluid flow path F2 through tube bank 100 might be biased towards first side 118 or second side 120. Accordingly, the angles of attack $\alpha$ could be different from first side 118 to second side 120, such as greater angles of attack $\alpha$ proximal to one of first side 118 and second side 120 compared to the other. In yet other examples, each of airfoil tubes 112 can have the same angle of attack $\alpha$.

Airfoil tubes 112 steer or redirect fluid flowing along external fluid flow path F2 away from first side 118 and second side 120 of tube bank 100. That is, airfoil tubes 112 can direct flow downstream toward a central portion of tube bank 100 such that flow is retained through tube bank 100 and significant portions are prevented from escaping out first side 118 or second side 120. Increased angles of attack $\alpha$ for ones of airfoil tubes 112 that are proximal to first side 118 or second side 120 (e.g., in rows 122A or 122I), compared to angles of attack $\alpha$ for more centrally located ones of airfoil tubes 112 (e.g., in row 122E), direct flow inwards and away from first side 118 and second side 120. Moreover, increasing angle of attack $\alpha$ incrementally in each row of airfoil tubes 112 outward from center row 122E can have an increasing effect on steering flow proximal to first side 118 and second side 120 compared to centrally.

Tube bank 100 including airfoil tubes 112 can improve the effectiveness of an open-volume heat exchanger (e.g., heat exchanger 12 as shown in FIGS. 1-2). Specifically, airfoil tubes 112 improve both flow capture and flow retention in tube bank 100. The airfoil shape of airfoil tubes 112 has low drag, which can create a pressure gradient to pull fluid through the center of tube bank 100, and the angle of attack $\alpha$ for ones of airfoil tubes 112 proximal to the open first side 118 or second side 120 of tube bank 100 can be selected to improve flow retention. Accordingly, airfoil tubes 112 can maximize the flow through tube bank 100 while minimizing the flow bypassing or escaping from tube bank 100 and can thereby improve the performance of a heat exchanger that includes tube bank 100. That is, a heat exchanger including tube bank 100 and airfoil tubes 112 can have better performance per mass compared to traditional open-volume heat exchangers with non-flow-modifying tubes. The improved performance can include improved heat transfer due to more retained flow, reduced pressure drop (especially in regions of the tube bank that would experience pressure drop from escaping flow in traditional open-volume heat exchangers), and reduced risk of flow induced vibrations typically caused by wakes from circular or elliptical tubes. Additionally, airfoil tubes 112 can reduce the need for flow retaining structures, such as enclosure walls, etc., that might otherwise be used to retain flow. Airfoil tubes 112 also have increased surface area compared to traditional circular or elliptical tubes, which also improves heat transfer capabilities.

Figure 5:
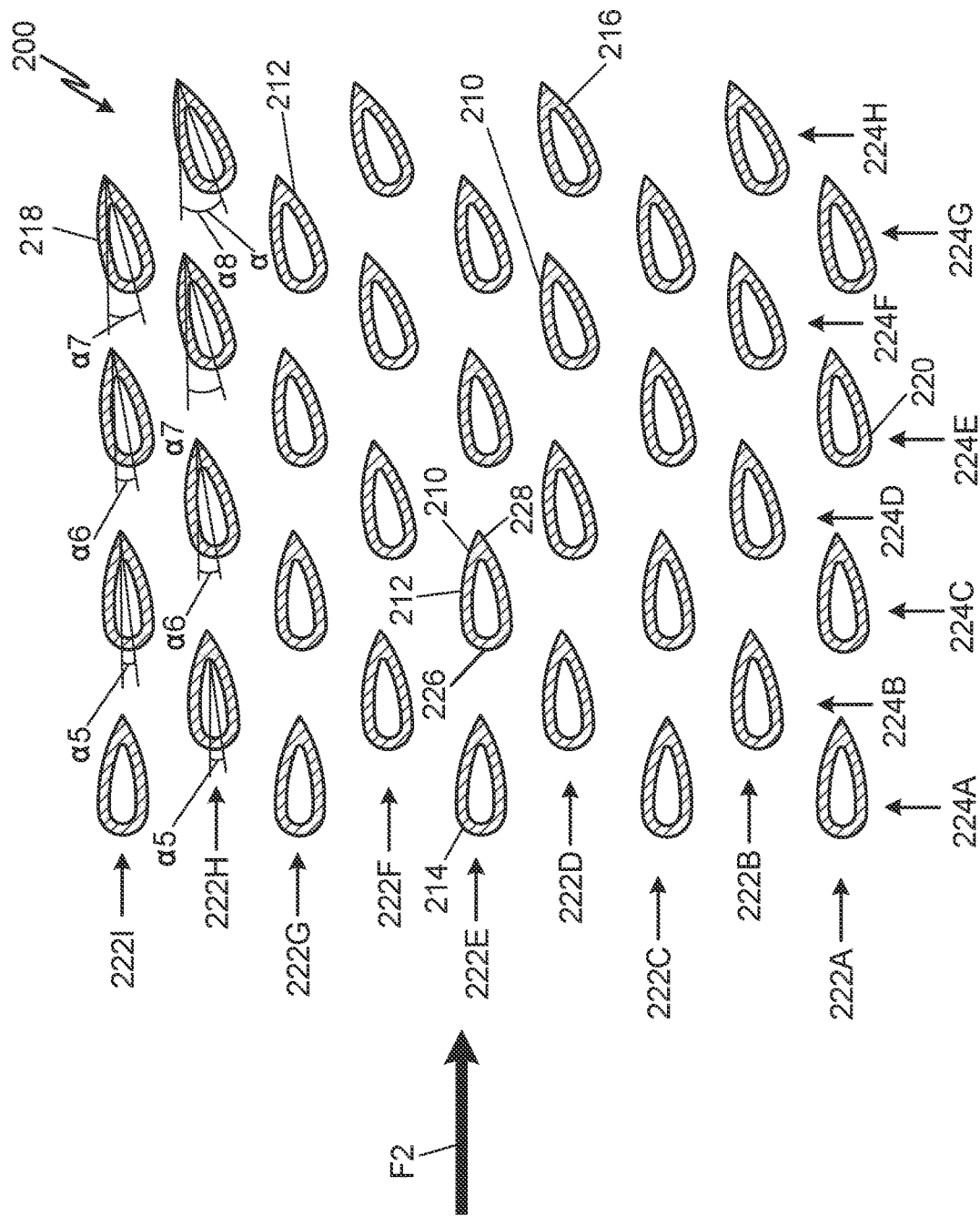
FIG. 5 is a schematic cross-sectional diagram illustrating a second example of flow-modifying core tubes.

FIG. 5 is a schematic cross-sectional diagram illustrating flow-modifying core tubes 210. FIG. 5 shows tube bank 200 including flow-modifying core tubes 210, which include airfoil tubes 212. Tube bank 200 also includes first end 214, second end 216, first side 218, and second side 220. Flow-modifying core tubes 210 are arranged in rows 222A-222I and columns 224A-224H. Each of airfoil tubes 212 has leading edge 226, trailing edge 228, and a corresponding angle of attack $\alpha 5$-$\alpha 8$ (referred to collectively herein as "angle of attack $\alpha$"). FIG. 5 also shows external fluid flow path F2.

Flow-modifying core tubes 210 are an example of flow-modifying core tubes 32, as shown in FIGS. 1-2. Moreover, tube bank 200 and flow-modifying core tubes 210 have a generally similar structure, design, and function to tube bank 100 and flow-modifying core tubes 110 described above with reference to FIG. 4, except angle of attack $\alpha$ for flow-modifying core tubes 210 varies between columns rather than between rows.

Flow-modifying core tubes 210 include airfoil tubes 212. In the example shown in FIG. 5, each of flow-modifying core tubes 210 is also one of airfoil tubes 212. In other examples, flow-modifying core tubes 210 can include airfoil tubes 212 and one or more differently shaped tubes, such as round shapes (e.g., as will be described in greater detail below with reference to FIGS. 6-7), regular or irregular polygonal shapes, etc. Airfoil tubes 212 have airfoil cross-sections. More specifically, airfoil tubes 212 have symmetric airfoil cross-sections. Each of airfoil tubes 212 extends from a corresponding leading edge 226 to a corresponding trailing edge 228. Leading edges 226 are relatively upstream portions of airfoil tubes 212, and trailing edges 228 are relatively downstream portions of airfoil tubes 212, with respect to fluid flowing along external fluid flow path F2.

Each of airfoil tubes 212 has a corresponding angle of attack α. For example, angle of attack α can vary from column to column (i.e., laterally through tube bank 200 along the direction of external fluid flow path F2). In other examples, angle of attack α can vary in other ways throughout tube bank 200, such as from tube to tube. In yet other examples, angle of attack α does not vary throughout tube bank 200. In the example shown in FIG. 5, ones of airfoil tubes 212 have different angles of attack α5-α8. Specifically, airfoil tubes 212 in column 224A have a zero-degree (0°) angle of attack (not shown), airfoil tubes 212 in columns 224B and 224C have angle of attack α5, airfoil tubes 212 in columns 224D and 224E have angle of attack α6, airfoil tubes 212 in columns 224F and 224G have angle of attack α7, and airfoil tubes 212 in column 224H have angle of attack α8. Each of angles of attack α5-α8 can be a different angle. As shown in FIG. 5, angles of attack α5-α8 can increase in a downstream direction with respect to fluid flowing along external fluid flow path F2, from first end 214 of tube bank 200 (e.g., column 224A) toward second end 216 (e.g., column 224H). The increase can be incremental in columns downstream from column 224A. In one example, angle of attack α5 can be five degrees (5°), angle of attack α6 can be ten degrees (10°), angle of attack α7 can be fifteen degrees (15°), and angle of attack α8 can be twenty degrees (20°). In other examples, angles of attack α5-α8 can be any suitable angles (including up to a maximum angle above which causes flow separation), and there can be more or fewer different angles of attack α throughout tube bank 200 in any pattern. For example, FIG. 5 shows airfoil tubes 212 arranged to steer flow in one direction, but more complex arrangements of airfoil tubes 212 can steer flow in multiple directions. In yet other examples, each of airfoil tubes 212 can have the same angle of attack α.

Airfoil tubes 212 steer or redirect fluid flowing along external fluid flow path F2. That is, airfoil tubes 212 can direct flow downstream through and out of tube bank 200, such that flow exits tube bank 200 in a certain direction and/or from a certain region of tube bank 200. For example, airfoil tubes 212 can be angled and arranged to steer flow around a downstream obstacle, such as another component. Increasing angle of attack α incrementally in columns of airfoil tubes 212 downstream from column 224A can have an increasing effect on steering flow proximal to second end 216 compared to first end 214.

Tube bank 200 including airfoil tubes 212 can improve the effectiveness of an open-volume heat exchanger (e.g., heat exchanger 12 as shown in FIGS. 1-2). Specifically, airfoil tubes 212 can be used to steer flow both within tube bank 200 and/or around downstream obstacles. Like airfoil tubes 112 shown in FIG. 4, airfoil tubes 212 also have increased surface area compared to traditional circular or elliptical tubes, which also improves heat transfer capabilities.

Figure 6:
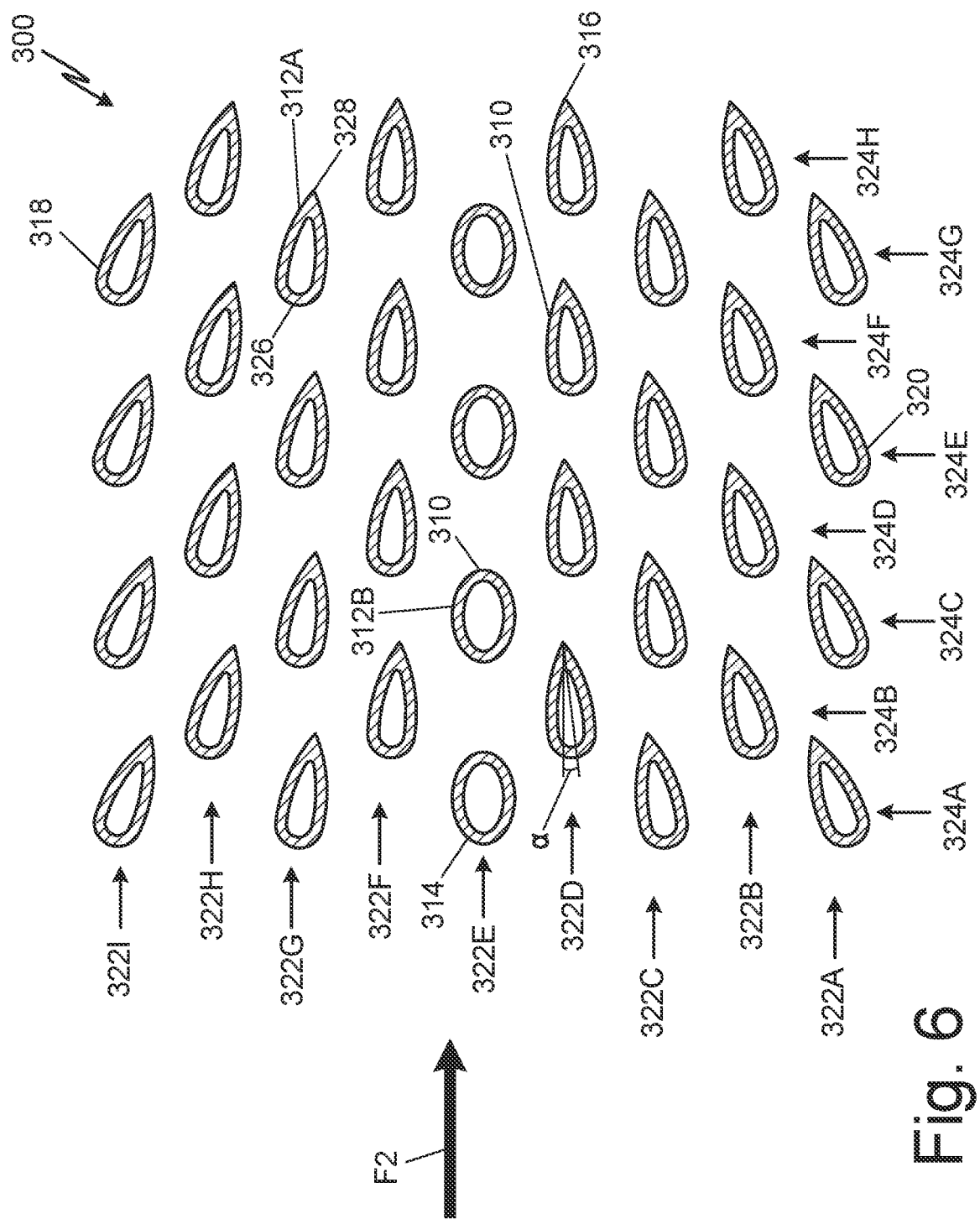
FIG. 6 is a schematic cross-sectional diagram illustrating a third example of flow-modifying core tubes.

FIG. 6 is a schematic cross-sectional diagram illustrating flow-modifying core tubes 310. FIG. 6 shows tube bank 300 including flow-modifying core tubes 310, which include airfoil tubes 312A and round tubes 312B. Tube bank 300 also includes first end 314, second end 316, first side 318, and second side 320. Flow-modifying core tubes 310 are arranged in rows 322A-322I and columns 324A-324H. Each of airfoil tubes 312A has leading edge 326, trailing edge 328, and a corresponding angle of attack α. FIG. 6 also shows external fluid flow path F2.

Flow-modifying core tubes 310 are an example of flow-modifying core tubes 32, as shown in FIGS. 1-2. Moreover, tube bank 300 and flow-modifying core tubes 310 have a generally similar structure, design, and function to tube bank 100 and flow-modifying core tubes 110 described above with reference to FIG. 4, except flow-modifying core tubes 310 include airfoil tubes 312A and round tubes 312B.

Flow-modifying core tubes 310 include airfoil tubes 312A and round tubes 312B. Round tubes 312B have round cross-sections, such as circular, elliptical, oval, etc. As shown in FIG. 6, each of flow-modifying core tubes 310 in row 322E ("center row 322E") is a round tube 312B. In some examples, round tubes 312B can be used in regions of tube bank 300 where flow should be directed neutrally (i.e., not redirected), such as in the middle of external fluid flow path F2, which is aligned with center row 322E in FIG. 6. Other examples can include other arrangements of round tubes 312B, such as in other rows or in combinations of rows. The remaining ones of flow-modifying core tubes 310 are airfoil tubes 312A, each of which has a corresponding angle of attack α that can vary between airfoil tubes 312A (e.g., as described previously).

As fluid flows along external fluid flow path F2, flow will interact with both airfoil tubes 312A and round tubes 312B in tube bank 300. Additional variation in the overall arrangement of flow-modifying core tubes 310 in tube bank 300 is possible using combinations of airfoil tubes 312A and round tubes 312B, as shown in FIG. 6. Accordingly, using a combination of airfoil tubes 312A and round tubes 312B in tube bank 300 allows for more precise tuning of flow and heat exchange characteristics throughout tube bank 300.

Figure 7:
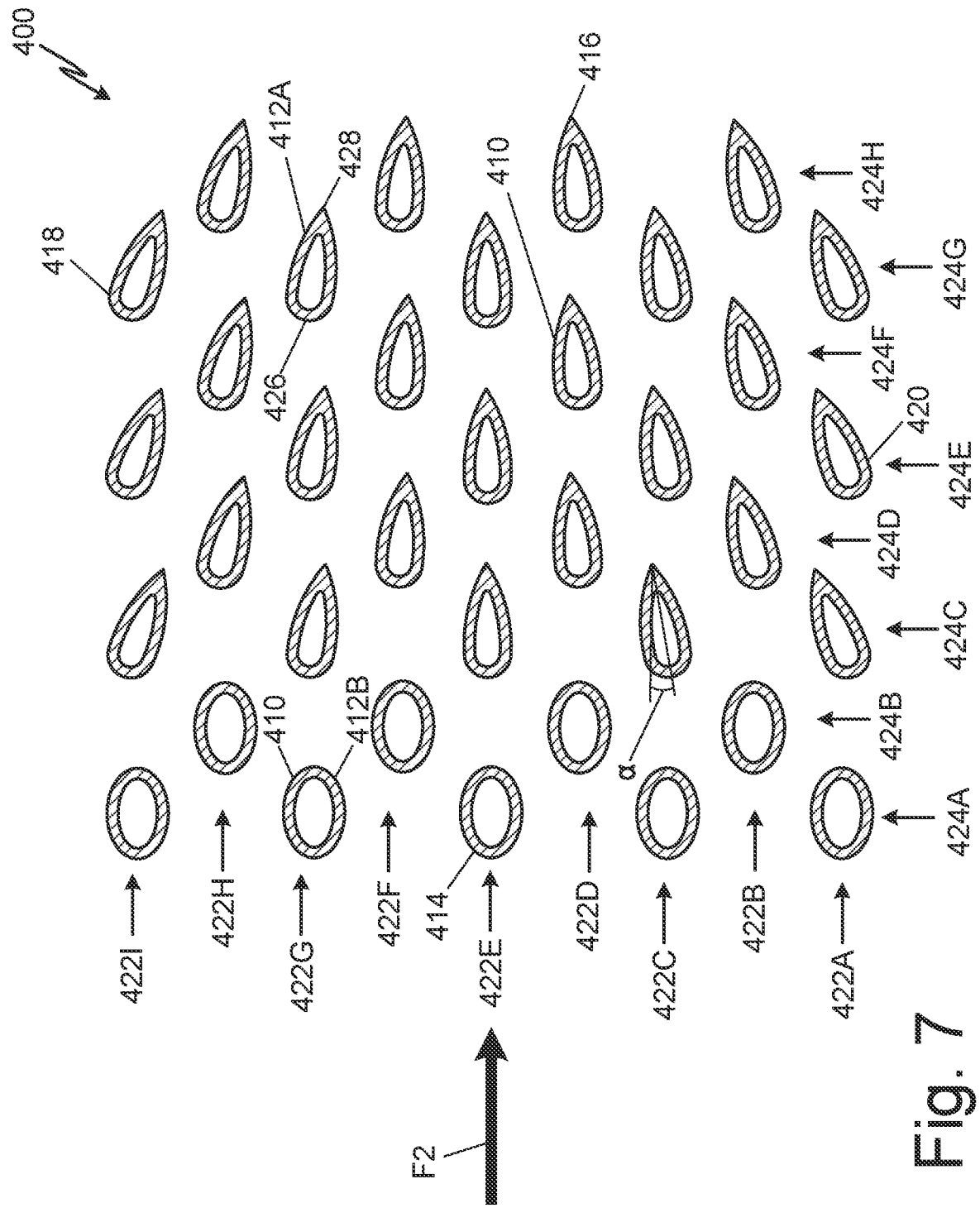
FIG. 7 is a schematic cross-sectional diagram illustrating a fourth example of flow-modifying core tubes.

FIG. 7 is a schematic cross-sectional diagram illustrating flow-modifying core tubes 410. FIG. 7 shows tube bank 400 including flow-modifying core tubes 410, which include airfoil tubes 412A and round tubes 412B. Tube bank 400 also includes first end 414, second end 416, first side 418, and second side 420. Flow-modifying core tubes 410 are arranged in rows 422A-422I and columns 424A-424H. Each of airfoil tubes 412A has leading edge 426, trailing edge 428, and a corresponding angle of attack α. FIG. 7 also shows external fluid flow path F2.

Flow-modifying core tubes 410 are an example of flow-modifying core tubes 32, as shown in FIGS. 1-2. Moreover, tube bank 400 and flow-modifying core tubes 410 have a generally similar structure, design, and function to tube bank 100 and flow-modifying core tubes 110 described above with reference to FIG. 4, except flow-modifying core tubes 410 include airfoil tubes 412A and round tubes 412B.

Flow-modifying core tubes 410 include airfoil tubes 412A and round tubes 412B. Round tubes 412B have round cross-sections, such as circular, elliptical, oval, etc. As shown in FIG. 7, each of flow-modifying core tubes 410 in columns 424A and 424B is a round tube 412B. In some examples, round tubes 412B can be used in regions of tube bank 400 where flow should be directed neutrally (i.e., not redirected), such as adjacent or proximal to first end 414, which includes columns 424A and 424B. That is, round tubes 412B can be the leading tubes of tube bank 400. Other examples can include other arrangements of round tubes 412B, such as in other columns or in other combinations of columns. The remaining ones of flow-modifying core tubes 410 are airfoil tubes 412A, each of which has a corresponding angle of attack α that can vary between airfoil tubes 412A (e.g., as described previously).

As fluid flows along external fluid flow path F2, flow will interact with both airfoil tubes 412A and round tubes 412B in tube bank 400. For example, round tubes 412B near first end 414 of tube bank 400 can generate more turbulence as flow enters tube bank 400, which can be a desired flow characteristic. Using round tubes 412B at first end 414 of tube bank 400 can also potentially improve the structural integrity of the leading tubes of tube bank 400 and thereby prevent damage during assembly and/or operation. Additional variation in the overall arrangement of flow-modifying core tubes 410 in tube bank 400 is possible using combinations of airfoil tubes 412A and round tubes 412B, as shown in FIG. 7. Accordingly, using a combination of airfoil tubes 412A and round tubes 412B in tube bank 400 allows for more precise tuning of flow and heat exchange characteristics throughout tube bank 400.

Figure 8:
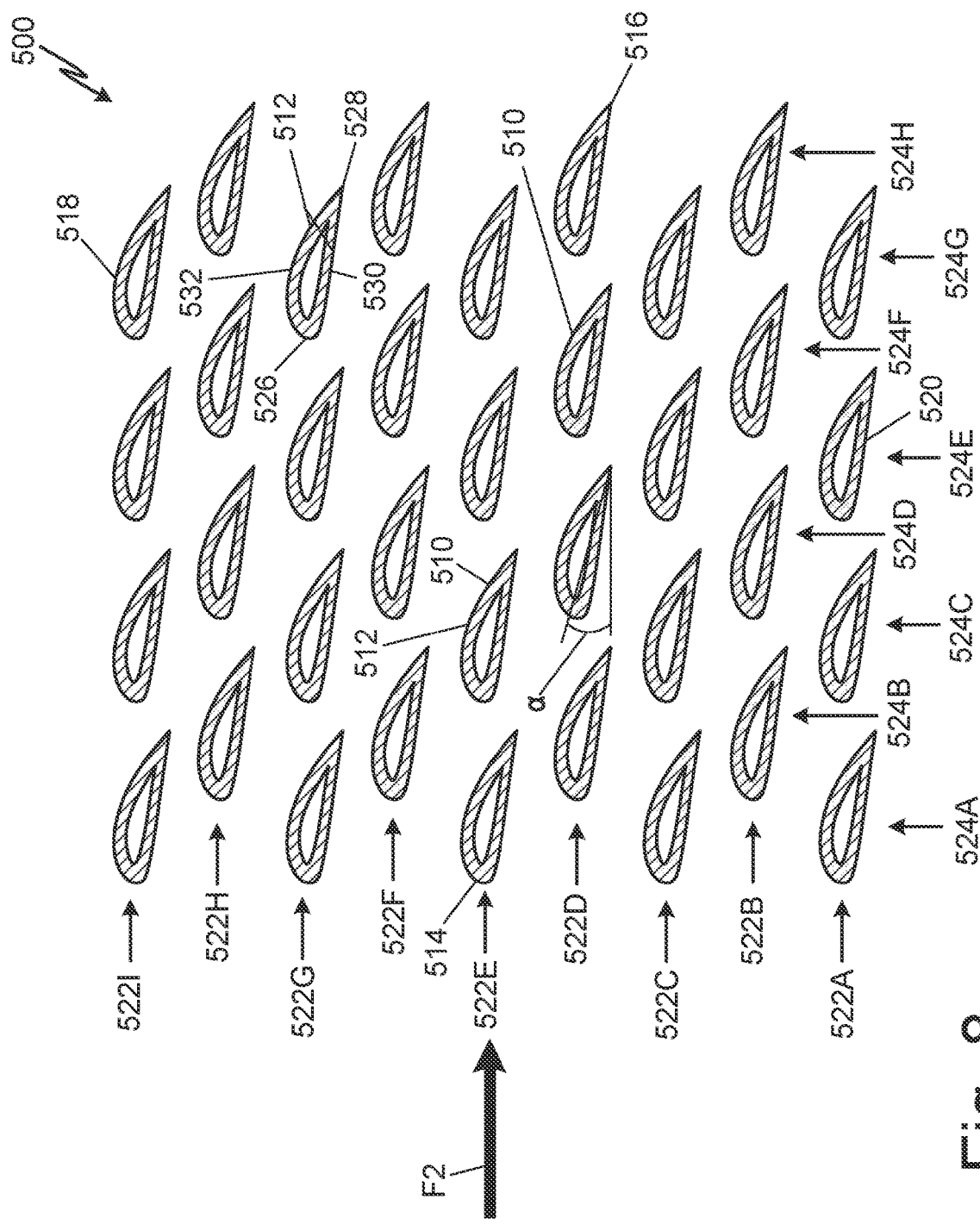
FIG. 8 is a schematic cross-sectional diagram illustrating a fifth example of flow-modifying core tubes.

FIG. 8 is a schematic cross-sectional diagram illustrating flow-modifying core tubes 510. FIG. 8 shows tube bank 500 including flow-modifying core tubes 510, which include asymmetric airfoil tubes 512. Tube bank 500 also includes first end 514, second end 516, first side 518, and second side 520. Flow-modifying core tubes 510 are arranged in rows 522A-522I and columns 524A-524H. Each of asymmetric airfoil tubes 512 has leading edge 526, trailing edge 528, pressure (lower) surface 530, suction (upper) surface 532 and a corresponding angle of attack α. FIG. 8 also shows external fluid flow path F2.

Flow-modifying core tubes 510 are an example of flow-modifying core tubes 32, as shown in FIGS. 1-2. Moreover, tube bank 500 and flow-modifying core tubes 510 have a generally similar structure, design, and function to tube bank 100 and flow-modifying core tubes 110 described above with reference to FIG. 4, except flow-modifying core tubes 510 include asymmetric airfoil tubes 512.

Flow-modifying core tubes 510 include symmetric airfoil tubes 512. In the example shown in FIG. 8, each of flow-modifying core tubes 510 is also one of asymmetric airfoil tubes 512. In other examples, flow-modifying core tubes 510 can include asymmetric airfoil tubes 512 and one or more differently shaped tubes, such as symmetric airfoil tubes (e.g., as described above with reference to FIGS. 4-5), round tubes (e.g., as described above with reference to FIGS. 6-7), or other shapes. Asymmetric airfoil tubes 512 have airfoil cross-sections. More specifically, asymmetric airfoil tubes 512 have asymmetric (or cambered) airfoil cross-sections. Each of asymmetric airfoil tubes 512 extends from a corresponding leading edge 526 to a corresponding trailing edge 528. Leading edges 526 are relatively upstream portions of airfoil tubes 512, and trailing edges 528 are relatively downstream portions of airfoil tubes 512, with respect to fluid flowing along external fluid flow path F2. Each of asymmetric airfoil tubes 512 also extends from a corresponding pressure surface 530 to a corresponding suction surface 532. Various asymmetric airfoil dimensions are possible for each of asymmetric airfoil tubes 512, such as variations in camber, thickness, etc., to result in different asymmetric airfoil shapes. These dimensions can vary from tube to tube or can be the same for each of asymmetric airfoil tubes 512. Each of asymmetric airfoil tubes 512 also has a corresponding angle of attack α that can vary between asymmetric airfoil tubes 512 (e.g., as described previously).

Using asymmetric airfoil tubes 512 as an alternative to or in combination with symmetric airfoils (e.g., airfoil tubes 112, 212, 312A, and 412A described previously) allows for directing or otherwise modifying flow through tube bank 500 with the effects of lift in a different way than by varying the angle of attack of symmetric airfoils. Accordingly, asymmetric airfoil tubes 512 provide another option for more precisely tuning flow and heat exchanger characteristics throughout tube bank 500.

FIG. 9 is a schematic diagram illustrating portions of flow-modifying core tube 610. FIG. 9A is a schematic cross-sectional view of first portion P1 of flow-modifying core tube 610 taken at section line 9A-9A of FIG. 9. FIG. 9B is a schematic cross-sectional view of second portion P2 of flow-modifying core tube 610 taken at section line 9B-9B of FIG. 9. FIG. 9C is a schematic cross-sectional view of third portion P3 of flow-modifying core tube 610 taken at section line 9C-9C of FIG. 9. FIGS. 9-9C will be described together. FIG. 9 shows flow-modifying core tube 610, which includes first portion P1, second portion P2, and third portion P3. FIG. 9 also shows section line 9A-9A, section line 9B-9B, section line 9C-9C, external fluid flow path F2, and lengthwise direction L. FIG. 9A shows first portion P1 including airfoil cross-section 612A, which has angle of attack αP1. FIG. 9B shows second portion P2 including airfoil cross-section 612B, which has angle of attack αP2. FIG. 9C shows third portion P3 including airfoil cross-section 612C.

Flow-modifying core tube 610 is an example of flow-modifying core tubes 32, as shown in FIGS. 1-2. Moreover, flow-modifying core tube 610 has a generally similar structure, design, and function to each of flow-modifying core tubes 110 described above with reference to FIG. 4, except flow-modifying core tube 610 includes portions with different cross-sections.

As shown in FIG. 9, flow-modifying core tube 610 includes first portion P1, second portion P2, and third portion P3 (referred to generally herein as "portions"). Each of first portion P1, second portion P2, and third portion P3 is a region along the length of flow-modifying core tube 610, i.e., in lengthwise direction L, which is in the direction of fluid flow along internal fluid flow path F1 through core 24, as shown in FIGS. 1-2. For example, first portion P1 can be a portion of flow-modifying core tube 610 that is adjacent to a heat exchanger header (e.g., first header 20 or second header 22, as shown in FIG. 1). Second portion P2 can be a portion of flow-modifying core tube 610 that is longitudinally inward (or towards a center along the length of flow-modifying core tube 610) of first portion P1. Third portion P3 can be a portion of flow-modifying core tube 610 that is longitudinally inward of second portion P2. In some examples, third portion P3 can be a central portion along the length of flow-modifying core tube 610.

First portion P1, second portion P2, and third portion P3 can have any relative and actual lengths, although relatively similar lengths of each are depicted in FIG. 9 for simplicity. Moreover, other examples of flow-modifying core tube 610 can include more or fewer distinct portions along its length or can include repeated portions having the same characteristics. In some examples, the transition between portions (e.g., from first portion P1 to second portion P2, etc.) can be gradual, such that the characteristics of first portion P1 gradually transition to the characteristics of second portion P2, etc. Additive manufacturing techniques can be used to manufacture flow-modifying core tube 610 having gradually transitioning cross-sections.

As shown in FIGS. 9A-9C, each of first portion P1 (FIG. 9A), second portion P2 (FIG. 9B), and third portion P3 (FIG. 9C) has a corresponding airfoil cross-section 612A-612C. Accordingly, flow-modifying core tube 610 can be considered an airfoil tube. Specifically, first portion P1 has airfoil cross-section 612A, second portion P2 has airfoil cross-section 612B, and third portion P3 has airfoil cross-section 612C. In the example shown in FIGS. 9A-9C, each of airfoil cross-sections 612A-612C is a symmetric airfoil cross-section. However, other examples could include other cross-sectional shapes, such as asymmetric airfoils, circles, ellipses, ovals, etc., or combinations thereof (e.g., as described previously).

First portion P1 has airfoil cross-section 612A, which has angle of attack αP1. In the example shown in FIG. 9A, angle of attack αP1 can be twenty degrees (20°). In examples where first portion P1 is a portion of flow-modifying core tube 610 that is adjacent to a heat exchanger header, angle of attack αP1 can be selected such that airfoil cross-section 612A has a greater effect on flow adjacent the header. In other examples, angle of attack αP1 can be any suitable angle. Second portion P2 has airfoil cross-section 612B, which has angle of attack αP2. In the example shown in FIG. 9B, angle of attack αP2 can be ten degrees (10°). In other examples, angle of attack αP2 can be any suitable angle. Third portion P3 has airfoil cross-section 612C, which has a zero-degree (0°) angle of attack (not shown in FIG. 9C). In examples where third portion P3 is a central portion along the length of flow-modifying core tube 610, a corresponding angle of attack can be selected, e.g., 0°, such that airfoil cross-section 612C has a neutral effect on flow (i.e., flow is not redirected). In other examples, airfoil cross-section 612C can have any suitable angle of attack. More generally, the cross-sectional shape and the angle of attack of flow-modifying core tube 610 can vary along its length in any suitable manner for modifying flow conditions in different regions of a heat exchanger in which flow-modifying core tube 610 is used. Moreover, a heat exchanger core (e.g., core 24 shown in FIGS. 1-2) can include one or more flow-modifying core tubes 610 with the same or different lengthwise variations.

Flow-modifying core tube 610, including first portion P1, second portion P2, and third portion P3, can further improve the effectiveness of an open-volume heat exchanger (e.g., heat exchanger 12 as shown in FIGS. 1-2). Variation in airfoil cross-sections 612A-612C in the different portions along the length of flow-modifying core tube 610 allows for adjusting flow and heat exchange characteristics in particular lengthwise regions of the heat exchanger, such as in regions where dead zones might typically occur due to the external fluid and internal fluid becoming more similar in temperature within the heat exchanger, regions adjacent to headers where there can be increased flow escaping, etc. In this way, flow-modifying core tube 610 provides another option for more precisely tuning flow and heat exchanger characteristics throughout a tube bank of a heat exchanger that includes flow-modifying core tube 610.

Referring to FIGS. 4-9C together, the shape, angle, and arrangement of flow-modifying core tubes 110, 210, 310, 410, 510, and 610 can be selected according to a desired set of heat exchanger performance parameters for a particular application. For example, the shape and/or angle of each of flow-modifying core tubes 110, 210, 310, 410, 510, and 610 can be individually selected using computational fluid dynamics (CFD) analysis based on selection criteria such as flow retention and pressure drop within a heat exchanger. The shape and/or angle of each of flow-modifying core tubes 110, 210, 310, 410, 510, and 610 can also be selected based on the system beyond the heat exchanger. For example, for airfoil tubes 112, 212, 312A, 412A, and 512 and airfoil cross-sections 612A-612C, selection criteria for airfoil angle of attack can include downstream features, and the airfoils can be used to direct flow around these features. The shape and/or angle of airfoil tubes 112, 212, 312A, 412A, and 512 and airfoil cross-sections 612A-612C can also be selected to modify vortex shedding frequencies. In another example, the shape, angle, and arrangement of flow-modifying core tubes 110, 210, 310, 410, 510, and 610 can be selected to adjust flow to modify a temperature profile within a heat exchanger core or along individual tubes. More generally, nearly infinite variations are possible utilizing variations of flow-modifying core tubes 110, 210, 310, 410, 510, and 610, as described herein, in groups of tubes, tube to tube, or within single tubes.

Discussion of Possible Embodiments

The following are non-exclusive descriptions of possible embodiments of the present invention.

A heat exchanger includes a first header including a fluid inlet, a second header positioned downstream of the first header with respect to a first internal fluid flow path of a first fluid and including a fluid outlet, and a core extending from the first header to the second header. The core includes a plurality of flow-modifying core tubes that are shaped, angled, and/or arranged to modify flow through the heat exchanger along a second external fluid flow path. The plurality of flow-modifying core tubes includes airfoil tubes with corresponding airfoil cross-sections.

The heat exchanger of the preceding paragraph can optionally include, additionally and/or alternatively, any one or more of the following features, configurations and/or additional components:

The corresponding airfoil cross-sections can be symmetric.

The corresponding airfoil cross-sections can be asymmetric.

The corresponding airfoil cross-sections can include both symmetric airfoil cross-sections and asymmetric airfoil cross-sections.

The airfoil tubes of the plurality of flow-modifying core tubes can have corresponding angles of attack that vary throughout the airfoil tubes.

The airfoil tubes of the plurality of flow-modifying core tubes can be arranged in a plurality of rows, and the corresponding angles of attack can vary between the rows of the plurality of rows.

The airfoil tubes of the plurality of flow-modifying core tubes can be arranged in a plurality of columns, and the corresponding angles of attack can vary between the columns of the plurality of columns.

At least one airfoil tube of the airfoil tubes can include multiple portions along its length and each portion of the multiple portions can have a corresponding angle of attack, such that the at least one airfoil tube can have a varying airfoil cross-section along its length.

The plurality of flow-modifying core tubes can further include round tubes with round cross-sections.

The plurality of flow-modifying core tubes can be arranged in a plurality of rows, and the round tubes can be in a central row of the plurality of rows.

The plurality of flow-modifying core tubes can make up a tube bank that extends from a first end to a second end with respect to the second external fluid flow path, the plurality of flow-modifying core tubes can be arranged in a plurality of columns, and the round tubes can be in a first column of the plurality of columns, the first column being adjacent to the first end of the tube bank.

The plurality of flow-modifying core tubes can make up a tube bank that extends from a first end to a second end with respect to the second external fluid flow path, the plurality of flow-modifying core tubes can be arranged in a plurality of columns, and the round tubes can be in a first column and a second column of the plurality of columns, the first column and the second column being proximal to the first end of the tube bank.

The heat exchanger can be an open-volume heat exchanger.

The heat exchanger including the plurality of flow-modifying core tubes can be additively manufactured as a single, monolithic unit.

At least one of the first header and the second header can be a fractal header.

At least one of the first header and the second header can include a consecutively branching tubular structure terminating in individual tubes that are continuous with corresponding ones of the plurality of flow-modifying core tubes.

The first header can receive the first fluid via the fluid inlet and the second header can discharge the first fluid via the fluid outlet, and an exterior surface of the heat exchanger can be exposed to a second fluid along the second external flow path in a crossflow arrangement.

The first fluid and the second fluid can have different temperatures.

An open-volume heat exchanger includes a first header including a fluid inlet, a second header positioned downstream of the first header with respect to a first internal fluid flow path of a first fluid and including a fluid outlet, and a core extending from the first header to the second header. The core includes a tube bank with open sides that extends from a first end to a second end with respect to a second external fluid flow path. The tube bank includes a plurality of airfoil tubes. One or more airfoil tubes of the plurality of airfoil tubes that are located proximal to the open sides of the tube bank are angled and/or shaped to modify flow through the heat exchanger along the second external fluid flow path such that portions of the flow are prevented from escaping through open sides of the tube bank.

A heat exchanger includes a first header including a fluid inlet, a second header positioned downstream of the first header with respect to a first internal fluid flow path of a first fluid and including a fluid outlet, and a core extending from the first header to the second header. The core includes a plurality of flow-modifying core tubes. The plurality of flow-modifying core tubes includes at least one of airfoil tubes with corresponding angles of attack that vary throughout the airfoil tubes or along ones of the airfoil tubes or a combination of airfoil tubes and round tubes.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A heat exchanger comprising:
   a first header including a fluid inlet;
   a second header positioned downstream of the first header with respect to a first internal fluid flow path of a first fluid and including a fluid outlet; and
   a core extending from the first header to the second header, the core comprising a plurality of flow-modifying core tubes that are shaped, angled, and arranged to modify flow through the heat exchanger along a second external fluid flow path, the plurality of flow-modifying core tubes including airfoil tubes with corresponding airfoil cross-sections,
   wherein the airfoil tubes of the plurality of flow-modifying core tubes are arranged in a plurality of rows, each of the plurality of rows comprising a subset of at least three of the plurality of flow-modifying core tubes, and wherein the angle of attack of the airflow tubes in any given row is larger than the angle of attack of the airfoil tubes in a row that is closer to the center row of the plurality of rows.

2. The heat exchanger of claim 1, wherein the corresponding airfoil cross-sections are symmetric.

3. The heat exchanger of claim 1, wherein the corresponding airfoil cross-sections are asymmetric.

4. The heat exchanger of claim 1, wherein the corresponding airfoil cross-sections include both symmetric airfoil cross-sections and asymmetric airfoil cross-sections.

5. The heat exchanger of claim 1, wherein at least one airfoil tube of the airfoil tubes includes multiple portions along its length and each portion of the multiple portions has a corresponding angle of attack, such that the at least one airfoil tube has a varying airfoil cross-section along its length.

6. The heat exchanger of claim 1, wherein the plurality of flow-modifying core tubes further includes round tubes with round cross-sections.

7. The heat exchanger of claim 6, wherein the plurality of flow-modifying core tubes are arranged in a plurality of rows, and wherein the round tubes are in a central row of the plurality of rows.

8. The heat exchanger of claim 1, wherein the heat exchanger is an open-volume heat exchanger.

9. The heat exchanger of claim 1, wherein the heat exchanger including the plurality of flow-modifying core tubes is configured to be additively manufactured as a single, monolithic unit.

10. The heat exchanger of claim 1, wherein at least one of the first header and the second header is a fractal header.

11. The heat exchanger of claim 1, wherein at least one of the first header and the second header includes a consecutively branching tubular structure terminating in individual tubes that are continuous with corresponding ones of the plurality of flow-modifying core tubes.

12. The heat exchanger of claim 1, wherein the first header is configured to receive the first fluid via the fluid inlet and the second header is configured to discharge the first fluid via the fluid outlet; and wherein an exterior surface of the heat exchanger is exposed to a second fluid along the second external flow path in a crossflow arrangement.

13. The heat exchanger of claim 12, wherein the first fluid and the second fluid have different temperatures.

14. The heat exchanger of claim 1, wherein each angle of attack of the airfoil tubes in the plurality of rows increases outwardly from a center row of the plurality of rows.

15. An open-volume heat exchanger comprising:
   a first header including a fluid inlet;
   a second header positioned downstream of the first header with respect to a first internal fluid flow path of a first fluid and including a fluid outlet; and
   a core extending from the first header to the second header, the core comprising a tube bank with open sides that extends from a first end to a second end with respect to a second external fluid flow path and that includes a plurality of airfoil tubes arranged in a plurality of rows, each of the plurality of rows comprising a subset of at least three of the plurality of airfoil tubes;
   wherein one or more airfoil tubes of the plurality of airfoil tubes that are located proximal to the open sides of the tube bank are angled or shaped to modify flow through the heat exchanger along the second external fluid flow path such that portions of the flow are prevented from escaping through open sides of the tube bank, and wherein the angle of attack of the airflow tubes in any given row is larger than the angle of attack of the airfoil tubes in a row that is closer to the center row of the plurality of rows.

16. A heat exchanger comprising:

a first header including a fluid inlet;

a second header positioned downstream of the first header with respect to a first internal fluid flow path of a first fluid and including a fluid outlet; and a core extending from the first header to the second header, the core comprising a plurality of flow-modifying core tubes arranged in a plurality of rows, each of the plurality of rows comprising a subset of at least three of the plurality of flow-modifying core tubes;

wherein the plurality of flow-modifying core tubes includes:

airfoil tubes arranged in the plurality of rows such that the angle of attack of the airflow tubes in any given row is larger than the angle of attack of the airfoil tubes in a row that is closer to the center row of the plurality of rows; and a combination of airfoil tubes and round tubes.

* * * * *